(12) United States Patent
Wennström et al.

(10) Patent No.: US 10,211,507 B2
(45) Date of Patent: Feb. 19, 2019

(54) COMMUNICATION DEVICE FOR MOUNTING TO INFRASTRUCTURE (71) Applicant: TELEFONAKTIEBOLAGET LM ERICSSON (PUBL), Stockholm (SE)

(72) Inventors: Håkan Wennström, Sävedalen (SE); Magnus Gustafsson, Alingsås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 275 days.

(21) Appl. No.: 15/033,896

(22) PCT Filed: Apr. 22, 2016

(86) PCT No.: PCT/EP2016/059108
§ 371 (c)(1),
(2) Date: May 2, 2016

(87) PCT Pub. No.: WO2017/182100
PCT Pub. Date: Oct. 26, 2017

(65) Prior Publication Data
US 2018/0115046 A1    Apr. 26, 2018

(51) Int. Cl.
H01Q 1/12       (2006.01)
H04L 1/00       (2006.01)
H01Q 3/00       (2006.01)
H01Q 3/08       (2006.01)
H04W 52/28      (2009.01)
H04B 17/27      (2015.01)

(52) U.S. Cl.
CPC ........... *H01Q 1/125* (2013.01); *H01Q 1/1228* (2013.01); *H01Q 3/005* (2013.01); *H04L 1/0001* (2013.01); *H01Q 3/08* (2013.01); *H04B 17/27* (2015.01); *H04W 52/285* (2013.01)

(58) Field of Classification Search
CPC ...... H01Q 1/1228; H01Q 1/125; H01Q 3/005; H01Q 3/08; H01Q 1/18; H04L 1/0001; H04W 52/285; H04B 17/27; G01S 7/02; G01S 13/86; G01S 13/68; G01S 13/00
USPC .......................................................... 340/3.1
See application file for complete search history.

(56) References Cited

U.S. PATENT DOCUMENTS 3,924,235 A * 12/1975 Heller ............... G01S 13/68
                                           342/195
3,968,496 A    7/1976  Brunvoll
5,485,156 A    1/1996  Manseur et al.

* cited by examiner

Primary Examiner — Ali Neyzari

(57) ABSTRACT

A communication device for mounting to an infrastructure, the communication device being configured for communication with a remote communication device via a directive antenna main lobe, the communication device comprising a sensor module configured to measure a movement of the communication device relative to a reference orientation.

18 Claims, 11 Drawing Sheets

COMMUNICATION DEVICE FOR MOUNTING TO INFRASTRUCTURE

TECHNICAL FIELD

The present disclosure relates to wireless communication systems and methods therefor, and in particular to a communication device for mounting to fixed infrastructure, configured for communication with a remote communication device via a directive antenna main lobe.

BACKGROUND

Communication networks are becoming denser, with more and more access points providing coverage to terminals. Such access points are deployed where needed, e.g., on lampposts or flagpoles, or even in trees. These access points are sometimes connected to the core network via point-to-point microwave radio links.

A microwave radio link or radio link system is a communication system that transmits data between two fixed locations over a point-to-point radio link.

Point-to-point radio links often use highly directive antennas, such as disc or horn antennas, for communication between a communication device and a remote communication device. Such highly directive antennas provide high antenna gains, and therefore have relatively narrow antenna main lobes. Due to the narrow antenna main lobes, the antennas of a point-to-point radio link need to be carefully aligned with respect to each other such that the narrow antenna main lobes point in the direction of communication.

It is known that some communication scenarios involve mobile infrastructure that is inherently mechanically unstable, such as communication from a ship, see, e.g., U.S. Pat. No. 3,968,496A, or from an aircraft, see, e.g., U.S. Pat. No. 5,485,156A. In these cases directive antennas are often equipped with sensor based motion detection systems which are used to control advanced mechanical stabilizing means or active antenna arrays adapted to compensate for movements due to mechanical instability.

SUMMARY

An object of the present disclosure is to provide a communication device, a communication system, a network control entity, a mounting bracket, and methods which seek to mitigate, alleviate, or eliminate one or more of the above-identified deficiencies in the art and disadvantages singly or in any combination.

This object is obtained by a communication system comprising a communication device for mounting to an infrastructure, and a remote communication device. The communication device is configured for communication with the remote communication device via a directive antenna main lobe. The communication device comprises a sensor module configured to measure a movement of the communication device relative to a reference orientation, and to provide data of said measurement of movement on an output port, wherein the data comprises an indication of the mechanical stability of the infrastructure.

Hereby, by obtaining the measurement data provided on the output port, a field engineer or an operator of the communication device can determine if a given performance degradation of the communication system is due to unstable installation of the communication device, causing variation in the pointing direction of an antenna main lobe, or if the performance degradation occurred due to other reasons. The operator, if it is determined that an installation of the communication device is unstable, may then take appropriate action to stabilize or re-deploy the communication device. Thus a more robust communication system is obtained without having to resort to sensor based motion detection systems used to control advanced mechanical stabilizing means or active antenna arrays adapted to compensate for mechanical instability in the infrastructure.

According to some aspects, the communication device comprises a message generation module connected to the output port and configured to generate and transmit a movement report message to the remote communication device. The movement report message comprises information related to a measured movement of the communication device relative to the reference orientation.

Hereby the remote communication device can adjust its mode of operation, by, e.g., changing coding or modulation method, to account for an unstable installation of the communication device. Thus a more robust communication system is obtained.

According to other aspects, the communication system comprises a network control entity configured to control routing of information in a data network comprising the communication device. The communication device comprises a network control interface module configured to generate and transmit a movement report message to the network control entity comprising information related to a measured movement of the communication device relative to the reference orientation.

Hereby routing of information in the data network can be performed taking any instability in installation of the communication device into account. Thus, a more robust data network is obtained.

There is also disclosed herein a network control entity configured to receive a movement report message from a communication device. The movement report message comprises information related to a measured movement of the communication device relative to a reference orientation. The network control entity is also configured to update a routing table for routing of information in a network comprising the communication device, based on the received movement report message.

The object is also obtained by a communication device for mounting to an infrastructure. The communication device is configured for communication with a remote communication device via a directive antenna main lobe. The communication device comprises a sensor module configured to measure a movement of the communication device relative to a reference orientation, and to provide data of said measurement of movement on an output port, wherein the data comprises an indication of the mechanical stability of the infrastructure.

Hereby, an operator can determine if performance degradation of the communication device is due to unstable installation, causing variation in the pointing direction of the antenna main lobe, or if the performance degradation occurred due to other reasons. The operator, if it is determined that an installation of the communication device is unstable, may then take appropriate action to stabilize or re-deploy the communication device. This way a more robust communication device is provided without having to resort to sensor based motion detection systems used to control advanced mechanical stabilizing means or active antenna arrays adapted to compensate for mechanical instability in the infrastructure.

The provided measurement data can also be used to adjust a communication method for communication over the radio link, to make the radio link more robust, and thereby reduce the probability of radio link outage.

According to aspects, the sensor module is arranged to measure the movement of the communication device relative to the reference orientation during communication with the remote communication device.

Hereby the stability of the communication device and the pointing direction of the antenna main lobe can be monitored during on-going communication, and alarm messages can be generated in real-time if and when instability of the communication device is detected. Thus a more swift response to instability is enabled.

There is also disclosed herein a mounting bracket for mounting a communication device to an infrastructure. The mounting bracket comprises a sensor module configured to measure a movement of the mounting bracket relative to a reference orientation, and to provide data of said measurement of movement on an output port. The data comprises an indication of the mechanical stability of the infrastructure.

The object is also obtained by a method in a communication device. The method comprises configuring a sensor module to measure a movement of the communication device relative to a reference orientation, measuring, by the sensor module, a movement of the communication device relative to a reference orientation, and providing data related to the measured movement of the communication device on an output port. The data comprises an indication of the mechanical stability of the infrastructure.

The data comprises an indication of a measure of movement and thereby an indication of whether the mechanical stability of the infrastructure is reliable at a given point in time. The indication may concern a measure of movement, formulated as a scalar rather than a vector, and possibly as an indication whether such a scalar is surpassing a predetermined threshold value or not in a given time interval. It is noted that known servo based mobile antenna systems compensate for the movement in order to adjust to given alignment between antennas. This compensation typically involves taking a vector of movement into account.

In the present invention the scalar of an angular deviation from an optimum line of alignment may be measured as further indicated in the figures.

There is also disclosed herein a computer program comprising computer program code which, when executed in a communication device, causes the communication device to execute a method as described herein.

The computer programs and the methods disclosed herein all display advantages corresponding to the advantages already described in relation to the communication device and the communication system.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Communication systems using highly directive antennas communicate via narrow antenna beams, and therefore have high antenna gains. However, due to the narrow antenna main lobe, the high antenna gain is only obtained in a certain communication direction, i.e., the pointing direction of the antenna main lobe. In all other directions the antenna gain is much lower. Therefore, it is important that high gain directive antennas are carefully aligned with respect to the direction of communication, and not in some other direction away from the intended direction of communication. This is especially true for fixed lobe antennas, such as disc or horn antennas, which cannot be re-configured during communication as, e.g., active antenna arrays can.

A consequence of this need for precision antenna alignment is that the directive antennas must be firmly mounted to fixed and stable infrastructure to make a stable antenna installation. If the antenna installation is not stable enough, then the antenna main lobe will change orientation over time as the infrastructure moves, which can significantly degrade performance.

It is appreciated that the term orientation used herein, according to some aspects, further comprises location, position, angle, or any other descriptive geometrical term which has an effect on the pointing direction of the antenna main lobe 155 with respect to an initial alignment direction or location of a remote communication device.

Stable antenna firmaments and installations are often expensive, and it is therefore economically advantageous to use existing infrastructure to mount directive antennas for, e.g., backhauling. Such existing infrastructure includes, e.g., lamp-posts, flagpoles, and trees. However, such installations may become too unstable, and may cause performance degradation, e.g., a reduction in received signal level (RSL).

It would be valuable if an operator could discover unstable antenna installations at an early stage, in order to be able to take action and either stabilize the existing installation or re-deploy the radio link to some alternative installation site. To measure changes in orientation of the antenna main lobe, a sensor module is included in the communication device. This way, valuable data regarding the stability of the installation can be obtained. For instance, a warning signal can be dispatched to an operator of the communication device if the communication device moves more than a permitted amount. The operator, upon receiving the warning signal, can then investigate on-site to see if the infrastructure needs to be strengthened or reinforced, or if re-deployment of the communication device is necessary.

Sensor based motion detection systems used to control advanced mechanical stabilizing means or active antenna arrays adapted to compensate for mechanical instability in the infrastructure would in most cases be able to compensate for unstable infrastructure. However, such advanced systems are costly, require maintenance, and add to the physical footprint of the communication apparatus.

Known communication devices comprising stabilizing means utilize movement sensor data internally to control stabilization devices. The proposed communication devices, systems, and methods, comprises sensor based motion detection systems where the measured movement data is provided on an output port, and the provided measurement data comprises an indication of the mechanical stability of the infrastructure.

Aspects of the present disclosure will now be described more fully with reference to the accompanying drawings. The apparatus, computer program and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Figure 1:
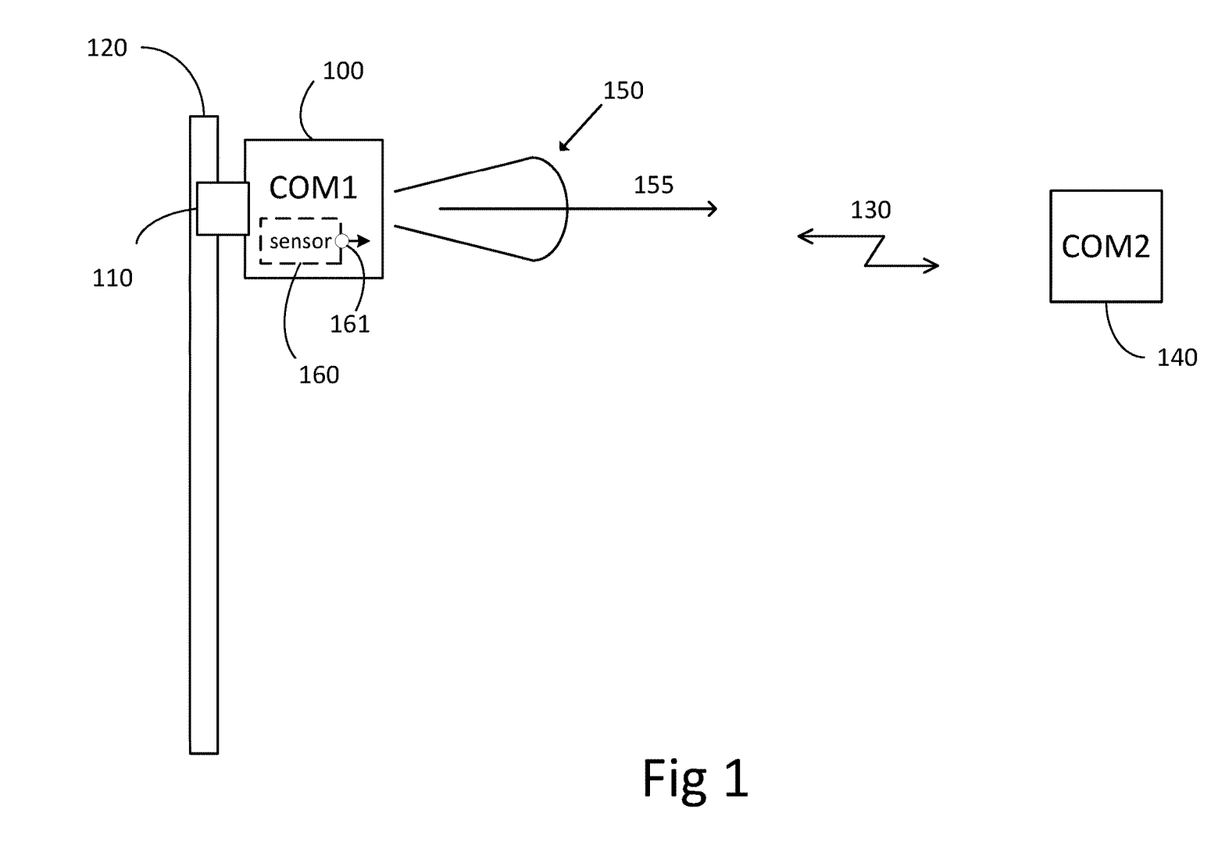
FIG. 1 shows a communication system according to aspects.

FIG. 1 illustrates a communication device 100 for mounting to an infrastructure 120. The infrastructure 120 is here shown as a mast, but can be any fixed infrastructure to which the communication device can be fixedly mounted, such as a building roof or wall, or a lamppost, or a tree. Infrastructure herein also comprises indoor infrastructure, such as staircases or indoor walls. If the infrastructure is stable enough, the antenna main lobe pointing direction 155 will remain fixed over time, and alignment of the directive antenna will therefore be maintained. However, some communication devices may be mounted to less stable infrastructure, in which case the antenna main lobe pointing direction will vary over time as the infrastructure moves. An example of such less stable infrastructure is trees, and some lampposts, which may move due to wind.

The communication device 100 shown in FIG. 1 is configured for communication 130 with a remote communication device 140 via a directive antenna main lobe 150. The antenna main lobe 150 has a pointing direction 155 shown in FIG. 1 as directed towards the remote communication device 140.

To measure movement, such as a pendulum motion of the communication device due to wind, or vibration due to external sources such as, e.g., nearby traffic, the communication device comprises a sensor module 160 configured to measure a movement of the communication device relative to a reference orientation, and to provide data of said measurement of movement on an output port 161. The data comprises an indication of the mechanical stability of the infrastructure, which means that analysis can be performed, using the provided data of measurement of movement as input, to establish or determine if the infrastructure is stable enough to provide reliable communication. Thus, it becomes possible to obtain information related to the stability of the installation of the communication device, and in particular related to the stability of the pointing direction 155, by accessing measurement data on the output port 161 of the sensor module 160. The sensor module, and aspects thereof, will be discussed in more detail in connection to FIG. 9 below.

Examples of types of data that can be provided on the output port 161 includes measured deviation in orientation or location compared to a reference orientation or location, an amplitude or measure of magnitude of said deviation in orientation or location compared to a reference orientation or location, or a quantized value indicating mechanical stability of the infrastructure. The data provided on the output port 161 can also be a flag, trigger or alarm signal indicating mechanical stability or mechanical instability, i.e., a one-bit indicator.

The data comprises an indication of a measure of movement and thereby an indication of whether the mechanical stability of the infrastructure is reliable at a given point in time. The indication may concern a measure of movement, formulated as a scalar quantity rather than a vector quantity, and possibly as an indication whether such a scalar is surpassing a predetermined threshold value or not in a given time interval.

It is noted that known servo based mobile antenna systems compensate for the movement in order to adjust to given alignment between antennas. This compensation typically involves taking a vector of movement into account.

In the present invention the scalar of an angular deviation from an optimum line of alignment may be measured as further indicated in the figures.

According to aspects, the provided data comprises an indication of a temporary reduction in mechanical stability of the infrastructure.

Figure 2A:
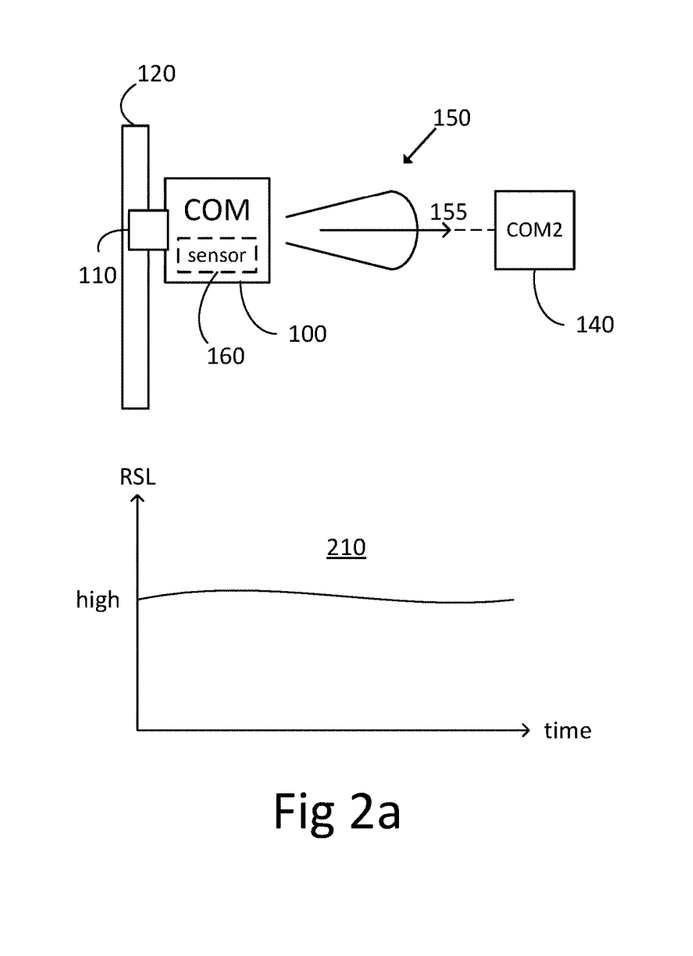
FIGS. 2a and 2b illustrate movement of a communication device according to aspects.

FIG. 2 schematically illustrates some consequences of mounting a communication device to non-stable infrastructure. In FIG. 2a, the main lobe pointing direction 155 has been aligned with respect to the remote communication device 140, and high antenna gain is obtained since the communication direction is coincides with the pointing direction 155 of the antenna main lobe 150. The graph 210 illustrates high received signal level (RSL) over time, only varying slightly due to normal fading.

Figure 2B:
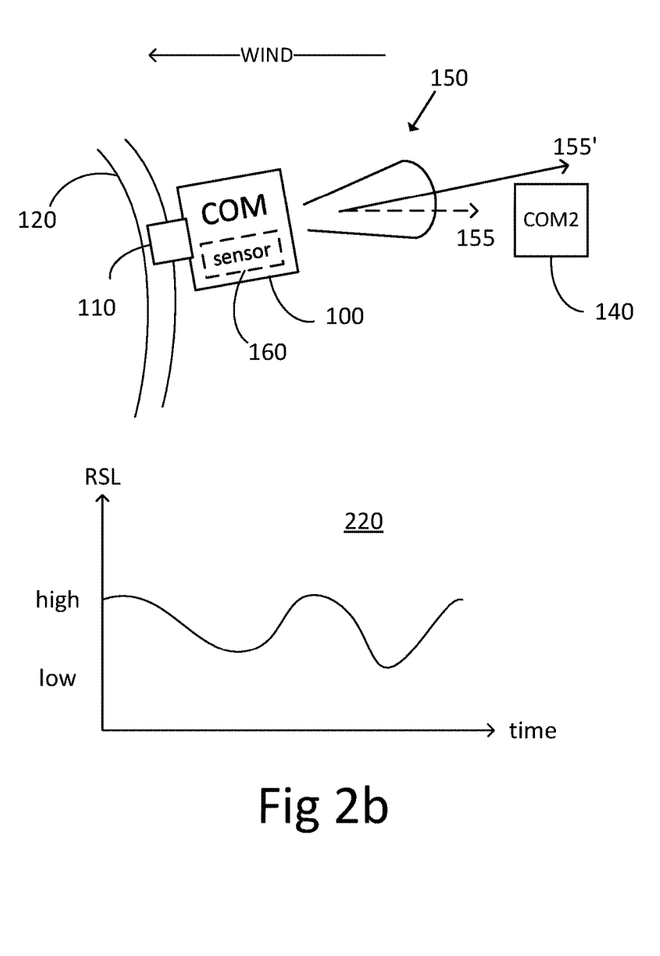

Suppose now that the infrastructure 120 is not stable enough to withstand, e.g., strong winds. FIG. 2b illustrates a situation when strong wind has caused the infrastructure to bend temporarily. Here, the pointing direction of the antenna main lobe 155' is not directly towards the remote communication device 140, which results in decreased antenna gain. Such temporary antenna misalignment may cause system degradation and even temporary system outage. From a receiver point of view this movement of the communication device and change in pointing direction will cause fluctuations in received signal power. The graph 220 illustrates varying RSL over time, with low dips that may result in outage.

Fluctuations in received signal power are however normal and also occur naturally with stable antenna installations due to, e.g., rain and multipath fading. It can therefore be difficult to distinguish the root cause of fluctuating received signal power. The data that is provided on the output port 161 will allow analysis to determine the root cause of fluctuating received signal power.

An operator of the communication system can benefit from knowing that these types of events occur, and are due to unstable installation, and act in order to reinforce the installation or re-deploy the communication system to a better more stable location.

An advantage of the proposed communication device is therefore that an operator may distinguish between normal fluctuations in received signal power and those caused by unstable antenna installations.

Figure 3:
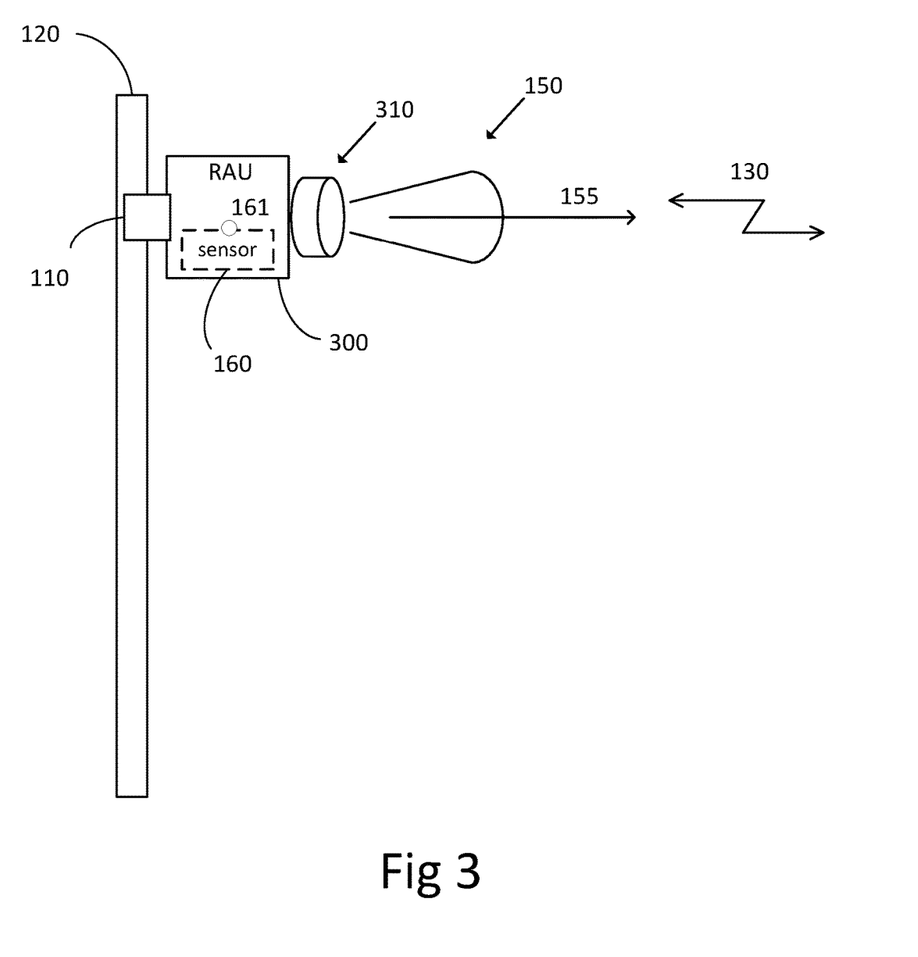
FIGS. 3-6 show communication devices according to aspects.

FIG. 3 shows a communication device according to some aspects. The above-mentioned sensor module can be deployed in a variety of places and still perform the same task of measuring change in orientation of the pointing direction by measuring a movement of the communication device relative to a reference orientation.

According to some aspects, the communication device is a radio unit (RAU) or microwave transceiver 300 adapted for communication 130 with the remote communication device via a directive antenna unit 310 having the directive antenna main lobe 150. In the example illustrated in FIG. 3, the sensor module is comprised in the RAU or microwave transceiver unit 300. The RAU or microwave transceiver is fixedly connected to the antenna unit 310, such that a movement or change in orientation of the RAU or microwave transceiver implies a movement also of the antenna unit 310 and therefore also a change in pointing direction of the antenna main lobe 150.

Figure 4:
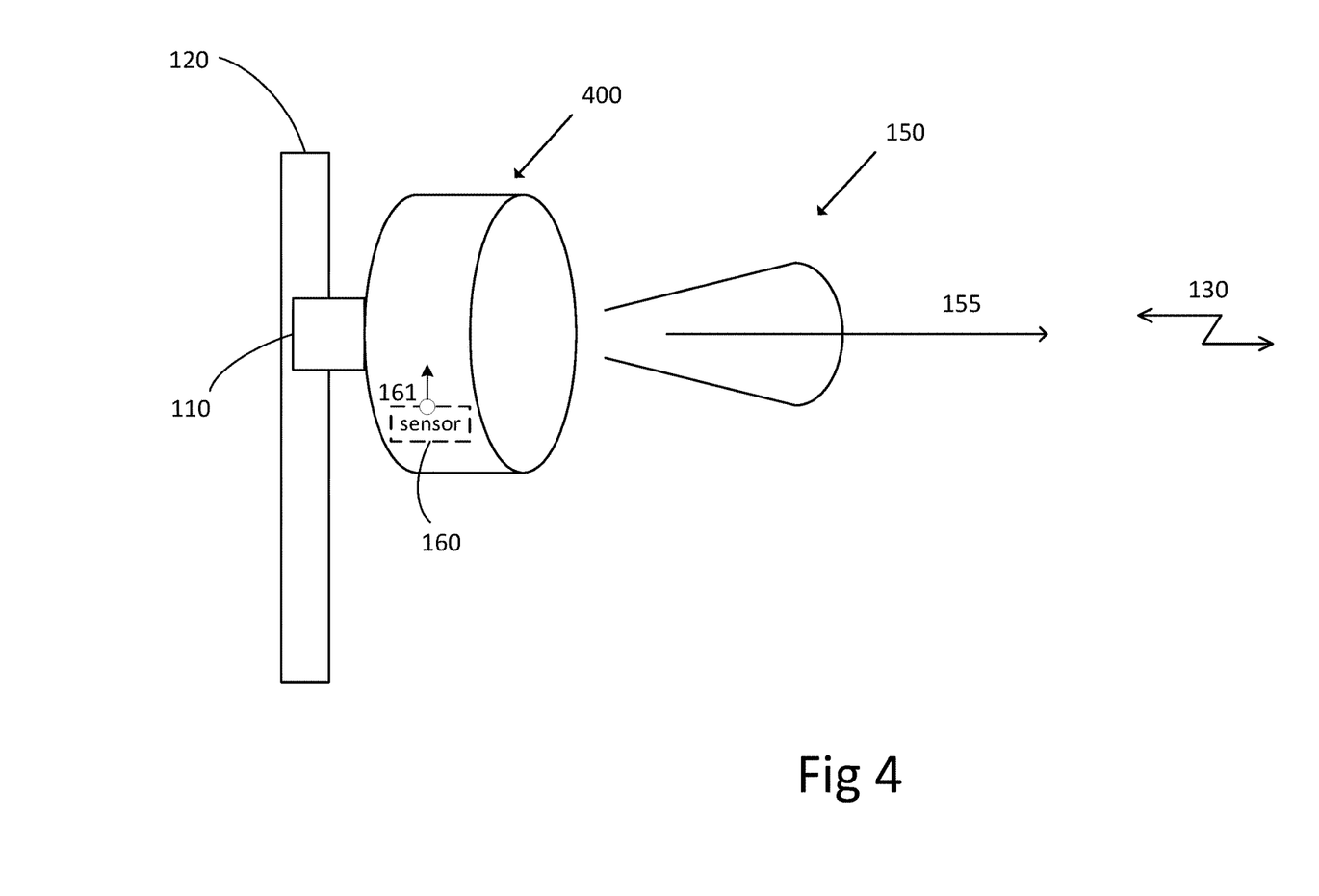

FIG. 4 shows a communication device according to some aspects. Here the communication device 400 is a directive antenna unit mounted to infrastructure 120 by a mounting bracket 110. The sensor module 160 is comprised in the antenna unit, and movement or changes in orientation of the antenna unit is measured by the sensor module. The data relating to the measurement can be accessed on the output port 161 of the sensor module.

The directive antenna unit illustrated in FIG. 4 is a disc antenna. However, the proposed technique is equally applicable to any directive antenna unit, such as a horn antenna.

Thus, according to some aspects, the communication device is a directive antenna unit 400 having the directive antenna main lobe 150.

Figure 5:
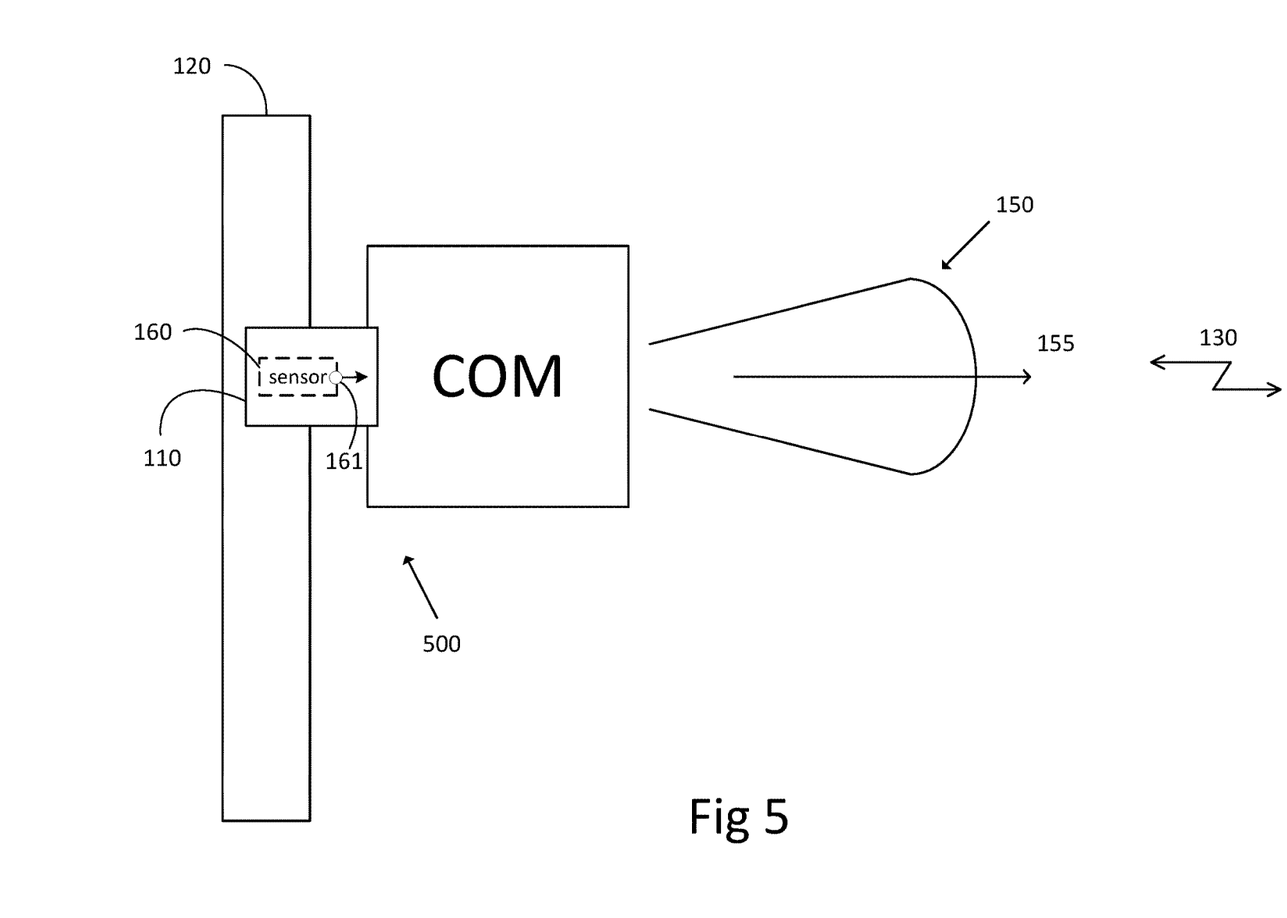

FIG. 5 shows a communication device according to some aspects. Here the sensor module is comprised in connection to the mounting bracket 110. A change in orientation of the mounting bracket means that the communication device has also changed orientation, or has somehow moved, which implies that the pointing direction 155 of the antenna main lobe 150 has also likely changed.

Thus, according to some aspects, the communication device 500 comprises a mounting bracket 110 for attaching the communication device to the infrastructure 120. The sensor module 160 is arranged in connection to the mounting bracket 110.

The present disclosure also relates to a mounting bracket 110 for mounting a communication device 500 to an infrastructure 120. The mounting bracket comprises a sensor module 160 configured to measure a movement of the mounting bracket relative to a reference orientation, and to provide data of said measurement of movement on an output port 161, wherein the data comprises an indication of the mechanical stability of the infrastructure.

Naturally, the different examples discussed in connection to FIGS. 3, 4, and 5 can be freely combined. I.e., a plurality of sensor modules can be used to simultaneously measure movement of the communication device at different places. Data related to movement of the communication device can then be accessed on multiple ports, or the ports can be combined into a single output port where all measurement data can be accessed.

Figure 6:
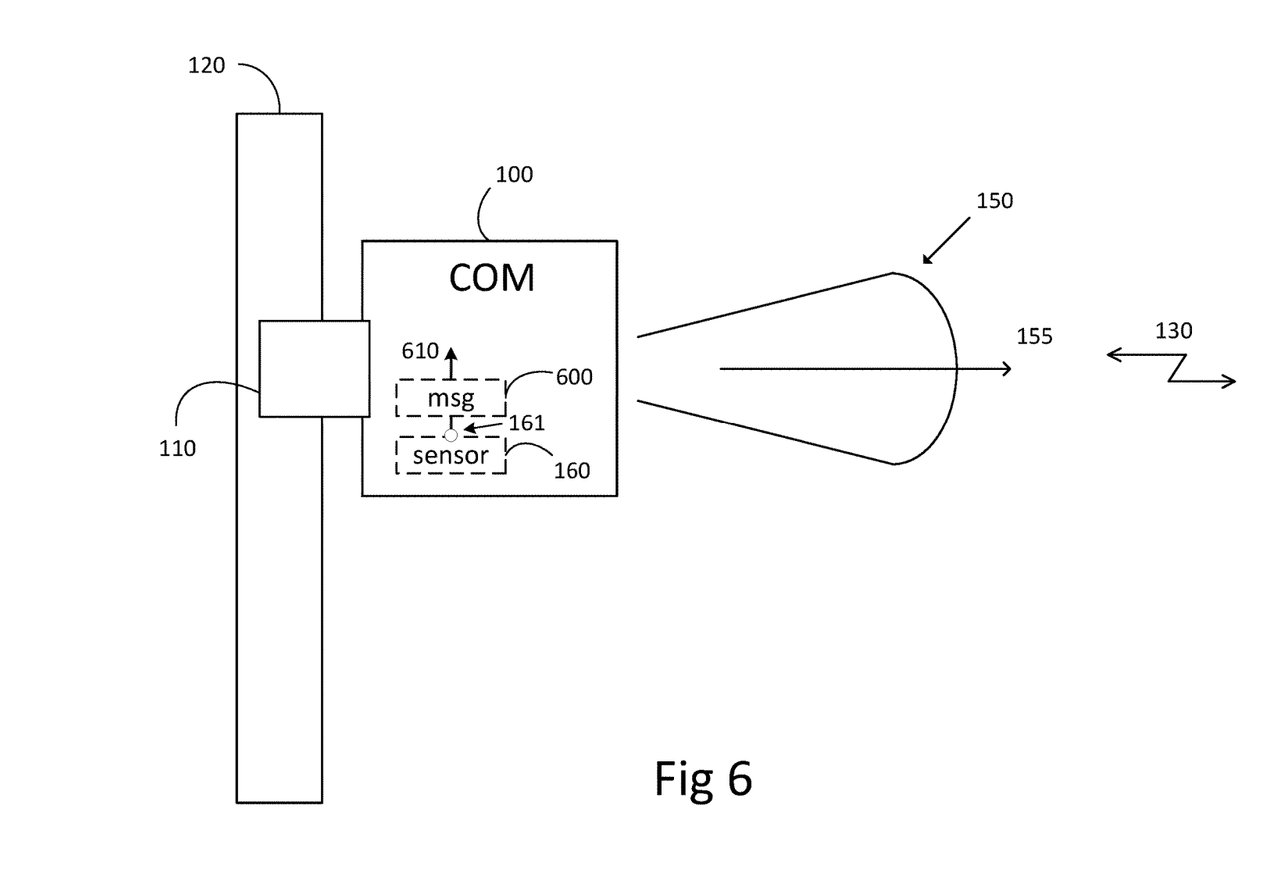

FIG. 6 shows a communication device according to some aspects.

The communication device illustrated in FIG. 6 comprises a messaging module 600 connected to the output port 161 of the sensor module.

According to some aspects, the messaging module is arranged to generate an output message 610 comprising an operations and maintenance (O&M) alarm when movement above a pre-configured threshold is measured by the sensor module 160. This O&M alarm can be dispatched to, or otherwise accessed by, an operator of the communication device in an operations and maintenance system. The operator can then investigate if the radio link has suffered from performance degradation, and if so connect the performance degradation to the measured movement of the communication device. The operator then can take action to either reinforce the infrastructure 120 or to re-deploy the communication device 100 to some other more suitable location.

According to some aspects, the messaging module 600 is arranged to generate an output message 610 for verifying stability of the mounting of the communication device to the infrastructure based on the measurement of the movement of the communication device relative to the reference orientation. This way, a deployment engineer can use the sensor data in order to verify stability of a new deployment. A new deployment showing too large movement need not be commissioned, but can be re-deployed instead to some other more suitable infrastructure, or the infrastructure can be reinforced in order to improve on the measurements by the sensor unit or units.

According to some aspects, the messaging module 600 is arranged to generate an output message 610 for determining a fade margin value of the communication 130 with the remote communication device. The fade margin value thus determined can be used to configure the radio communication method of the radio link between the communication device and the remote communication device. For instance, should the installation be found to be somewhat unstable, a reduced coding and modulation scheme can be applied in order to ensure that the radio link remains in operation and does not suffer from extended periods of outage.

Figure 7:
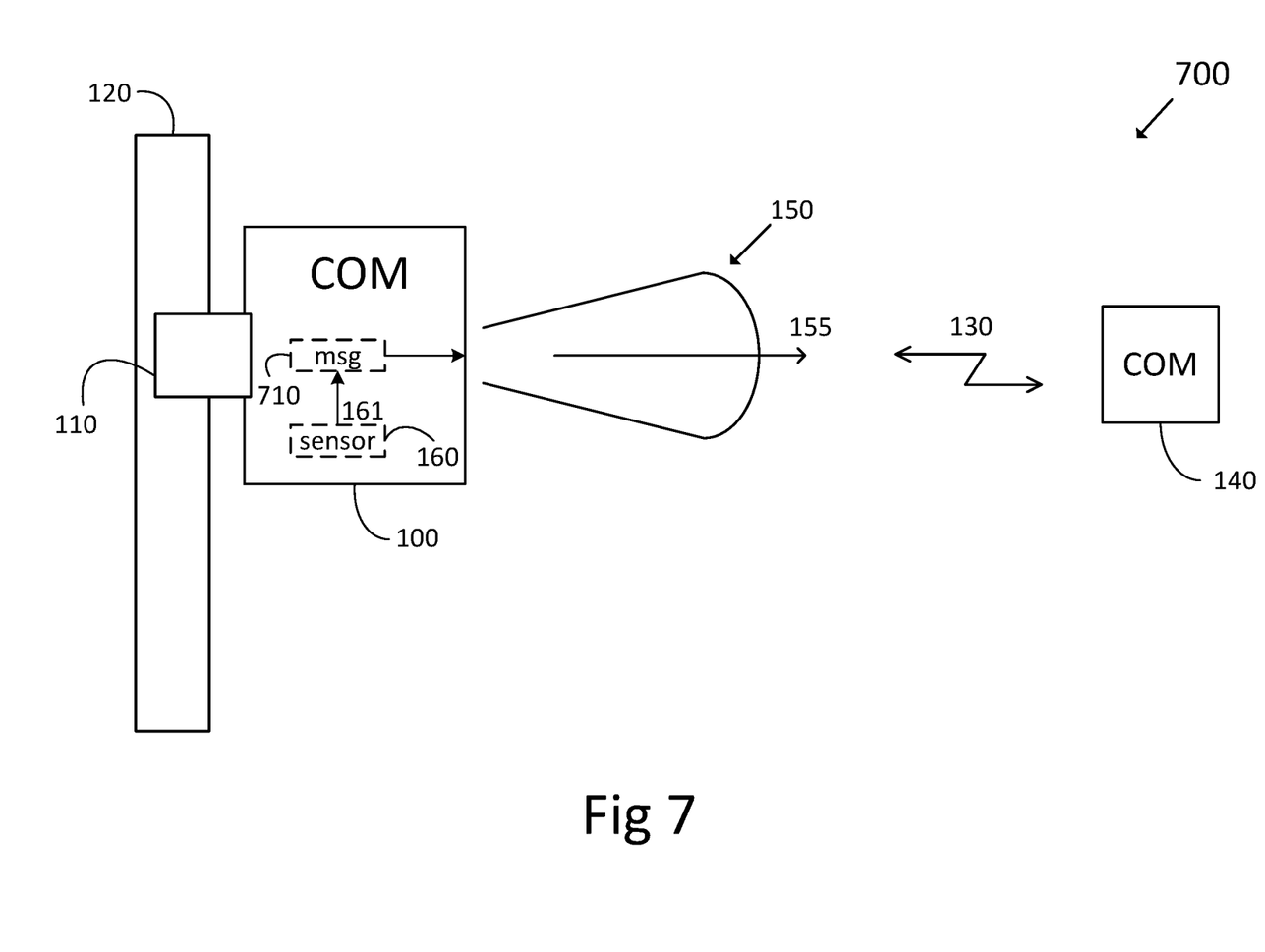
FIG. 7 shows a communication system according to aspects.

FIG. 7 shows a communication system 700 according to some aspects. The communication device 100 discussed above is here shown together with a remote communication device to make a communication system 700. The communication system 700 comprises a communication device 100 for mounting to an infrastructure 120 and a remote communication device 140, the communication device 100 is configured for communication 130 with the remote communication device 140 via a directive antenna main lobe 150. The communication device comprises a sensor module 160 configured to measure a movement of the communication device relative to a reference orientation, and to provide data of said measurement of movement on an output port 161, wherein the data comprises an indication of the mechanical stability of the infrastructure.

According to some aspects, the communication device comprises a message generation module 710 connected to the output port 161 and configured to generate and transmit a movement report message to the remote communication device 140. The movement report message comprises information related to a measured movement of the communication device relative to the reference orientation.

Thus the remote communication device 140 obtains information about the stability of the installation of the communication device with which it is communicating. This information can be used for many different features and functions which provide an increased robustness of the communication system to outage.

For instance, the remote communication device can be configured to adjust a modulation and/or coding method of communication 130 between remote communication device and the communication device based on the received movement report message. This way, in case the communication device 100 reports movement above some threshold in the movement report, the remote communication device can respond by adapting modulation and or coding of communication 130 to be more robust, in order to ensure that the radio link remains in operation and outage does not occur.

The remote communication device can also be configured to adjust a transmission power of radio transmission to the communication device 100 based on the received movement report message. This way, in case the communication device 100 reports movement above some threshold in the movement report, the remote communication device can respond by adapting transmission power of the communication 130 to be more robust, in order to ensure that the radio link remains in operation and outage does not occur.

Figure 8:
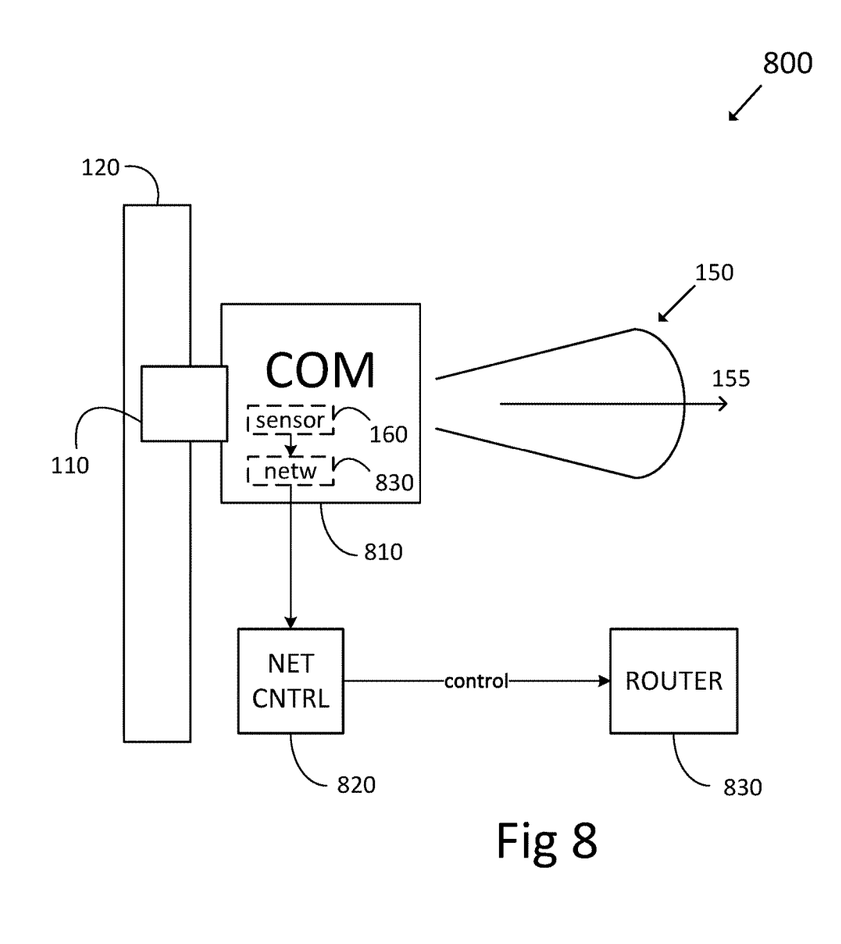
FIG. 8 shows a communication device according to aspects.

FIG. 8 shows a communication system 800 according to some aspects.

The communication system 800 comprises a network control entity 820 configured to control routing of information in a data network comprising the communication device. The communication device comprises a network control interface module 830 configured to generate and transmit a movement report message to the network control entity comprising information related to a measured movement of the communication device relative to the reference orientation.

Thus, the network control entity, via the movement report message, becomes aware of the stability of the infrastructure 120 and of the pointing direction 155 of the antenna main lobe 150. In case the antenna main lobe is not stably aligned, it may be prudent to route important information via alternate paths away from the radio link. For instance, best effort traffic can be routed over the radio link while more important traffic can be routed via alternative more robust paths.

The network control entity may also have access to weather reports, and can then correlate the movement report received from the network control interface module 830 with the weather report so see a connection between antenna pointing direction instability and, e.g., strong winds. The network control entity may then preemptively re-route information away from the radio link in case strong winds are expected, and route important information over the radio link in case the weather is calm.

There is also disclosed herein a network control entity 820 configured to receive a movement report message from a communication device 810 as discussed herein. The movement report message comprises information related to a measured movement of the communication device relative to a reference orientation. The network control entity 820 is also configured to update a routing table for routing of information in a network comprising the communication device, based on the received movement report message.

Figure 9:
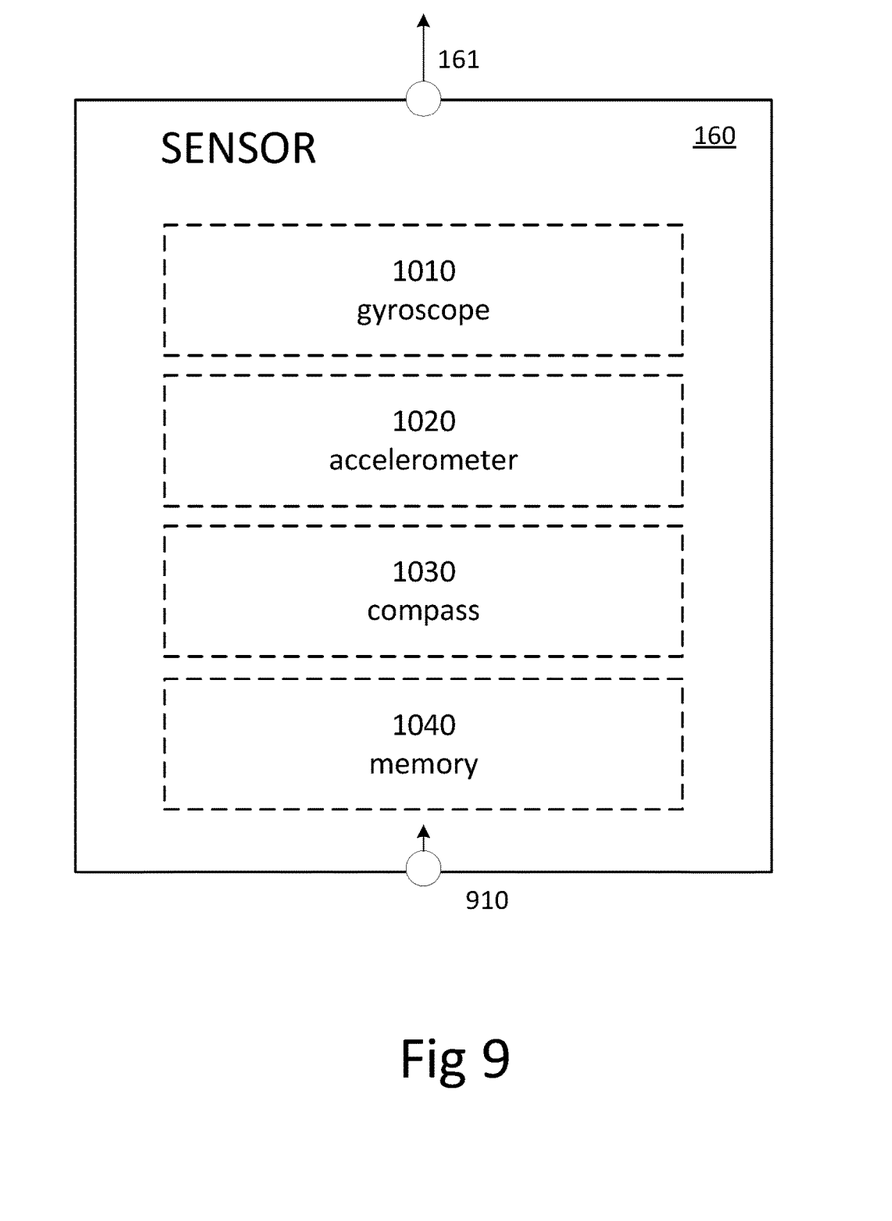
FIG. 9 shows a sensor module according to aspects.

FIG. 9 shows a sensor module according to some aspects. It is appreciated that there are many different hardware options for use in the sensor module to measure the above-discussed movement and changes in orientation of the communication device.

According to some aspects, the sensor module 160 comprises a gyroscope configured to measure the movement of the communication device relative to the reference orientation.

According to some aspects, the sensor module 160 comprises an accelerometer configured to measure the movement of the communication device relative to the reference orientation.

According to some aspects, the sensor module 160 comprises a compass configured to measure the movement of the communication device relative to the reference orientation.

According to some aspects, the sensor module 160 is arranged to measure the movement of the communication device relative to the reference orientation during communication with the remote communication device.

The sensor devices in the sensor module can be arranged to measure knacking, i.e., impact from hail or heavy rain, or vibration, as well as translation, or changes in orientation.

Furthermore, the sensor module can be equipped with a memory module 1040 to store measurements over time. This enables a time series analysis of the movement, from which the root cause of movement can be derived. For instance, by correlating the stored movement measurements with weather reports it is possible to infer if the movement is caused by strong winds. By correlating the stored measurements with, e.g., a train time table one can infer if vibrations are due to train traffic, and take appropriate measure. The memory module 1040 can be accessed from the output port 161. FIG. 9 shows a general purpose input port of the sensor module which input port can be used to initialize the sensor module, by providing, e.g., a reference orientation or location, or to reset the sensor module upon deployment of the communication device.

It is appreciated that combinations of sensor technologies may be used in the sensor module. Thus, the sensor module may comprise any combination of sensor devices, and may provide output from the different sensor devices on the same output port 161.

Figure 10:
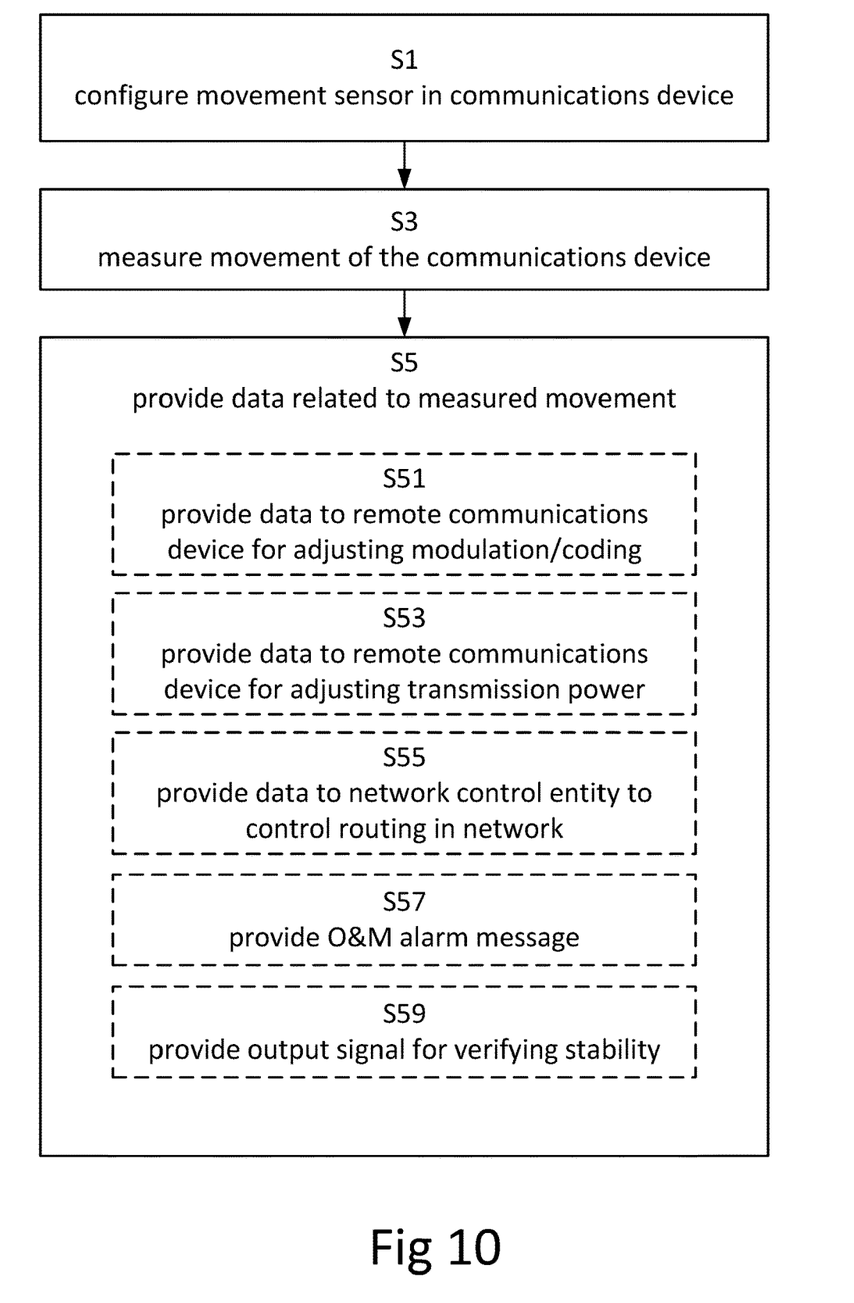
FIG. 10 is a flowchart illustrating methods according to aspects of the disclosure, FIG. 11 schematically illustrates a communication device.

FIG. 10 is a flowchart illustrating methods according to aspects of the disclosure. The communication device 100 comprising the sensor module is used in the described method. All advantages and mechanisms discussed above in connection to the devices apply also to the corresponding methods.

In particular, there is illustrated a method in a communication device 100. The method comprises configuring S1 a sensor module 160 to measure a movement of the communication device relative to a reference orientation, and measuring S3, by the sensor module, a movement of the communication device relative to a reference orientation, as well as providing S5 data related to the measured movement of the communication device on an output port, wherein the data comprises an indication of the mechanical stability of the infrastructure.

According to some aspects, the providing comprises providing S51 the data to a remote communication device 140 arranged to configure a modulation and/or coding method for transmission to the communication device based on the provided movement data.

According to some aspects, the providing comprises providing S53 the data to a remote communication device 140 arranged to configure a transmission power for transmission to the communication device based on the provided movement data.

According to some aspects, the providing comprises providing S55 the data to a network control entity 820 configured to control routing of information in a data network comprising the communication device based on the provided movement data.

According to some aspects, the providing comprises providing S57 an output signal 610 comprising an O&M alarm when movement above a pre-configured threshold is measured by the sensor module 160.

According to some aspects, the providing comprises providing S59 an output signal 610 for verifying stability of the mounting of the communication device to infrastructure based on the measurement of the movement of the communication device relative to a reference orientation.

Figure 11:
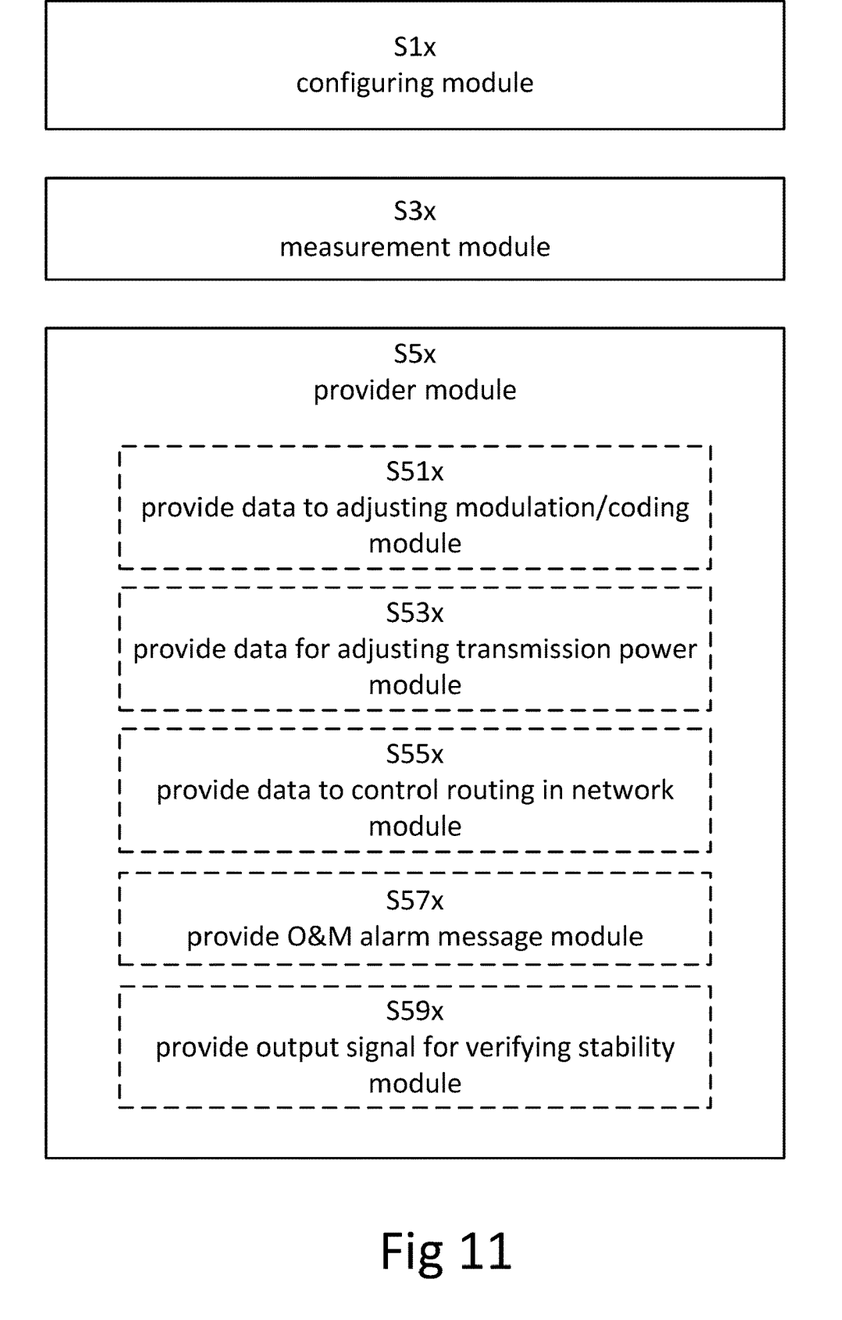

FIG. 11 illustrates a communication device configured to execute the methods discussed in connection to FIG. 10. In particular, FIG. 11 illustrates a communication device comprising a configuring module S1x arranged to configure a sensor module 160 to measure a movement of the communication device relative to a reference orientation. The communication device also comprises a measurement module S3x adapted to measure, by the sensor module, a movement of the communication device relative to a reference orientation. The communication device also comprises a provider module S5x arranged to provide data related to the measured movement of the communication device on an output port, wherein the data comprises an indication of the mechanical stability of the infrastructure.

According to aspects, the provider module S5$x$ comprises a sub-module S51$x$ arranged to provide the data to a remote communication device (140) arranged to configure a modulation and/or coding method for transmission to the communication device based on the provided movement data.

According to aspects, the provider module S5$x$ comprises a sub-module S53$x$ arranged to provide the data to a remote communication device (140) arranged to configure a transmission power for transmission to the communication device based on the provided movement data.

According to aspects, the provider module S5$x$ comprises a sub-module S55$x$ arranged to provide the data to a network control entity (820) configured to control routing of information in a data network comprising the communication device based on the provided movement data.

According to aspects, the provider module S5$x$ comprises a sub-module S57$x$ arranged to provide an output signal (610) comprising an operations and maintenance (O&M) alarm when movement above a pre-configured threshold is measured by the sensor module (160).

According to aspects, the provider module S5$x$ comprises a sub-module S59$x$ arranged to provide an output signal (610) for verifying stability of the mounting of the communication device to infrastructure based on the measurement of the movement of the communication device relative to a reference orientation.

The various aspects of the methods described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A communication system comprising:
a communication device for mounting to an infrastructure,
a remote communication device, and
a directive antenna main lobe,
wherein the communication device is configured for communication with the remote communication device via the directive antenna main lobe,
wherein the communication device comprises a sensor module configured to:
measure a movement of the communication device relative to a reference orientation, and
provide data of said measurement of movement on an output port, wherein the data comprises an indication of the mechanical stability of the infrastructure.

2. The communication system according to claim 1, wherein the communication device further comprises a message generation module connected to the output port and configured to generate and transmit a movement report message to the remote communication device, the movement report message comprising information related to a measured movement of the communication device relative to the reference orientation.

3. The communication system according to claim 2, wherein the remote communication device is configured to adjust a modulation and/or coding method of communication between remote communication device and the communication device based on the received movement report message.

4. The communication system according to claim 2, wherein the remote communication device is configured to adjust a transmission power of radio transmission to the communication device based on the received movement report message.

5. The communication system according to claim 1, further comprising a network control entity configured to control routing of information in a data network comprising the communication device,
wherein the communication device further comprises a network control interface module configured to generate and transmit a movement report message to the network control entity comprising information related to a measured movement of the communication device relative to the reference orientation.

6. A communication device configured to be mounted to an infrastructure, the communication device being configured for communication with a remote communication device, the communication device comprising:
a directive antenna main lobe configured to communicate with a remote communication device;
a sensor module configured to measure a movement of the communication device relative to a reference orientation, and;
an output port configured to provide data of the measured movement of the communication device relative to the reference orientation, wherein the data comprises an indication of the mechanical stability of the infrastructure.

7. The communication device according to claim 6:
wherein the communication device is a radio unit (RAU) or a microwave transceiver adapted for communication with the remote communication device; and
further comprising a directive antenna unit having the directive antenna main lobe.

8. The communication device according to claim 6, wherein the communication device is a directive antenna unit having the directive antenna main lobe.

9. The communication device according to claim 6, further comprising a mounting bracket for attaching the communication device to the infrastructure, wherein the sensor module is arranged in connection to the mounting bracket.

10. The communication device according to claim 6, wherein the sensor module comprises a gyroscope configured to measure the movement of the communication device relative to the reference orientation.

11. The communication device according to claim 6 wherein the sensor module comprises an accelerometer configured to measure the movement of the communication device relative to the reference orientation.

12. The communication device according to claim 6 wherein the sensor module comprises a compass configured to measure the movement of the communication device relative to the reference orientation.

13. The communication device according to claim 6 wherein the sensor module is arranged to measure the movement of the communication device relative to the reference orientation during communication with the remote communication device.

14. The communication device according to claim 6 further comprising a messaging module connected to the output port and arranged to generate an output message comprising an operations and maintenance, O&M, alarm when movement above a pre-configured threshold is measured by the sensor module.

15. The communication device according to claim 6 further comprising a messaging module connected to the sensor module and arranged to generate an output message for verifying stability of the mounting of the communication device to the infrastructure based on the measurement of the movement of the communication device relative to the reference orientation.

16. The communication device according to claim 6 further comprising a messaging module connected to the sensor module and arranged to generate an output message for determining a fade margin value of the communication with the remote communication device.

17. The communication device according to claim 6 further comprising a message generation module connected to the output port and configured to generate and transmit a movement report message to a remote communication device, the movement report message comprising information related to a measured movement of the communication device relative to the reference orientation.

18. The communication device according to claim 6 further comprising a network control interface module configured to send a movement report message to a network control entity, the movement report message comprising information related to the measured movement of the communication device relative to a reference orientation, the movement report message used to update a routing table for routing of information in a network comprising the communication device.

* * * * *